United States Patent
Jennings et al.

(10) Patent No.: US 10,232,341 B2
(45) Date of Patent: Mar. 19, 2019

(54) APPARATUS AND METHOD FOR CONTINUOUS PRODUCTION OF POLYETHYLENE GLYCOL DINITRATE

(71) Applicant: AVOCET IP LIMITED, Berwick upon Tweed (GB)

(72) Inventors: James Robert Jennings, Yarm (GB); Glyn David Short, Hockessin, DE (US)

(73) Assignee: AVOCET IP LIMITED, Berwick Upon Tweed (GB)

( * ) Notice: Subject to any disclaimer, the term of this patent is extended or adjusted under 35 U.S.C. 154(b) by 0 days.

(21) Appl. No.: 15/551,108

(22) PCT Filed: Feb. 15, 2016

(86) PCT No.: PCT/EP2016/025012
§ 371 (c)(1),
(2) Date: Aug. 15, 2017

(87) PCT Pub. No.: WO2016/128147
PCT Pub. Date: Aug. 18, 2016

(65) Prior Publication Data
US 2018/0029004 A1    Feb. 1, 2018

(30) Foreign Application Priority Data
Feb. 15, 2015    (GB) .................................. 1502523.2

(51) Int. Cl.
*B01J 19/24*    (2006.01)
*B01J 19/00*    (2006.01)
(Continued)

(52) U.S. Cl.
CPC .......... *B01J 19/245* (2013.01); *B01J 19/002* (2013.01); *B01J 19/06* (2013.01); *C08G 65/325* (2013.01);
(Continued)

(58) Field of Classification Search
CPC ...... B01J 19/245; B01J 19/242; B01J 19/002; B01J 19/06; C10L 1/231; C10L 1/238
See application file for complete search history.

(56) References Cited

U.S. PATENT DOCUMENTS

| | | | |
|---|---|---|---|
| 2,378,466 A | 6/1945 | Curme, Jr. | |
| 4,853,157 A * | 8/1989 | Stiff | C07C 201/02 558/483 |

(Continued)

FOREIGN PATENT DOCUMENTS

| | | |
|---|---|---|
| EP | 0116197 A2 | 8/1984 |
| EP | 0129995 A2 | 1/1985 |

OTHER PUBLICATIONS

International Search Report, Application No. PCT/EP2016/045012, dated Jun. 3, 2016, 3 pages.
(Continued)

*Primary Examiner* — Lessanework Seifu
(74) *Attorney, Agent, or Firm* — Ziegler IP Law Group, LLC

(57) ABSTRACT

An apparatus for producing polyethylene glycol dinitrate. The apparatus includes providing continuously an acid composition and a glycol composition to a reaction apparatus; reacting the acid composition and the glycol composition in the reaction apparatus in a continuous manner to generate a reaction composition; using an alkaline composition to at least partially neutralize the reaction composition to cause at least a portion of the polyethylene glycol dinitrate to deposit from a solution of the reaction composition; and extracting the deposit of polyethylene glycol dinitrate.

11 Claims, 3 Drawing Sheets

(51) Int. Cl.
*C10L 1/23* (2006.01)
*C08G 65/325* (2006.01)
*C10L 1/238* (2006.01)
*C10L 10/12* (2006.01)
*B01J 19/06* (2006.01)

(52) U.S. Cl.
CPC .............. *C10L 1/231* (2013.01); *C10L 1/238* (2013.01); *C10L 10/12* (2013.01); *B01J 2219/00033* (2013.01); *B01J 2219/00087* (2013.01); *B01J 2219/00261* (2013.01); *C10L 2270/026* (2013.01)

(56) References Cited

U.S. PATENT DOCUMENTS

2006/0171864 A1* 8/2006 Caze .................... B01F 5/0603
                                                                                  422/130
2012/0130115 A1   5/2012 Straessler et al.

OTHER PUBLICATIONS

J.P. Agrawal et al. "Organice Chemistry of Explosives" John Wiley & Sons, Ltd, Copyright 2007, ISBN-13: 978-0-470-02967-1; ISBN-10: 0-470-02967-6, 417 pages.

* cited by examiner

APPARATUS AND METHOD FOR CONTINUOUS PRODUCTION OF POLYETHYLENE GLYCOL DINITRATE

TECHNICAL FIELD

The present disclosure generally relates to fuel additives, for example polyethylene glycol (PEG) or polyethylene glycol dinitrate (PEGDN), to be used in conjunction with combustible hydrocarbon fuels. Specifically, the present disclosure relates to an apparatus and a method of producing aforementioned fuel additives using a continuous process.

BACKGROUND

It is contemporary practice to combust fuels together with fuel additives in cylinders of internal combustion engines, wherein the fuel additives assist to protect the engines from oxidative corrosion, as well as providing a degree of lubrication and cetane control In certain engines, the fuel includes an additive, such that the fuel and additive are injected through a same nozzle of a given cylinder; conversely, in other engines, an additive is injected separately to a hydrocarbon fuel into cylinders, by using multiple nozzles per cylinder.

Polyethylene glycol dinitrate (PEGDN) is a known additive for use with hydrocarbon fuels. Moreover, it is known practice to manufacture PEG nitrate in a two-step chemical process as provided in Table 1.

TABLE 1

| Known PEGDN manufacturing process | |
| --- | --- |
| Step | Reaction |
| 1 | $nC_2H_4O + H_2O \rightarrow HO\text{---}(CH_2CH_2\text{---}O)_nH$ |
| 2 | $ROH + HNO_3 \rightarrow R\text{---}O\text{---}N{=}_O^{=O}$ |

In Table 1, "R" represents a molecular grouping including ethylene glycol.

In a known publication "Organic Chemistry of Explosives (2007)" by P. Agrawal and R D. Hodgson, there is described a mixed acid generated from sulphuric and nitric acids, which still remains a most important reagent for the industrial production of nitrate esters:

$$H_2SO_4 + HONO_2 \rightleftharpoons H_2\overset{+}{O}NO_2 + HSO_4^-$$
$$H_2SO_4 + H_2\overset{+}{O}NO_2 \rightleftharpoons NO_2^+ + HSO_4^- + H_3O^+$$
$$2\,H_2SO_4 + HONO_2 \rightleftharpoons NO_2^+ + 2\,HSO_4^- + H_3O^+$$

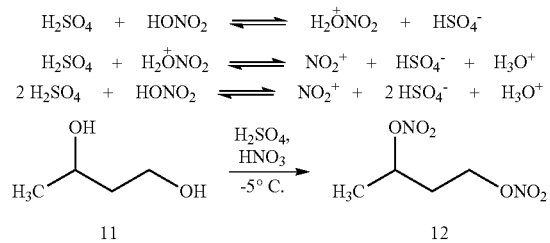

Generally, nitrations with mixed acid and nitric acid are exothermic. Therefore, on a large scale, there is always a potential problem of thermal runaway and an associated risk of explosion. Consequently, on an industrial scale, the mixed acid nitration of polyols requires strict control, including:
(i) remote handling;
(ii) elaborate reactors; and
(iii) blast-proof buildings.

Further, conventional nitration usually follows a batch or a semi-batch approach, where the mixing of reactants and the reaction itself are carried out very slowly. A continuous process has also been claimed by Corning Incorporated USA, using their Advanced Flow Reactor. However, specifically for the production of PEGDN, some of the most important concerns, which do not allow for an easy scale-up include: (i) an inadequate heat transfer area, (ii) an inhomogeneous system, mainly due to immiscible substrates and inefficient mixing, leading to mass transfer limitations, (iii) batch to batch variation in the degree of conversion, yield and selectivity, (iv) prolonged reaction times, (v) reactions at very low temperatures to reduce the rate of heat generation, (vi) the use of excess nitrating agent, mainly the spent acid, which occupies significant volume, has to be neutralized thereby needing large quantity of water, and generates inorganic salts.

Moreover, product separation may be a frequent problem associated with the mixed acid nitration of polyols. There arises a mixed acid residue from the method, and associated aqueous washings often contain considerable amounts of dissolved nitrate ester, presenting both a safety and a waste problem; ethylene glycol dinitrate is soluble in water to the extent of 0.5 g per 100 ml.

Therefore, there is a need for improved apparatus and method of producing fuel additives, for example based on ethylene glycol nitrates, for example PEG, which address aforementioned problems more effectively.

SUMMARY

The present disclosure seeks to provide an improved apparatus for producing nitrate esters, for example polyethylene glycol dinitrate.

According to an aspect, there is provided a reaction apparatus for producing in a continuous manner polyethylene glycol dinitrate (PEGDN), characterized in that the reaction apparatus includes
a series of reaction cells spatially disposed in one or more planar structures, the plurality of reaction cells constitute;
  a feed preparation section having feedstreams for continuously providing an acid composition and a glycol composition to reaction cells thereof, wherein the acid composition includes a mixture of dilute nitric acid and concentrated sulphuric acid;
  a nitration section in which the acid composition and the glycol composition react in reaction cells in a continuous manner to generate a reaction composition;
  a quench and neutralization section having a feed for a cooling arrangement for cooling reaction cells to avoid spatial reaction hotspots and thereby preventing thermal runaway occurring within the reaction apparatus, and a plurality of feeds for providing an alkaline composition to at least partially neutralize the reaction composition to cause at least a portion of the polyethylene glycol dinitrate to deposit from a solution of the reaction composition; and
  a separation arrangement for extracting the deposit of polyethylene glycol dinitrate.

In one embodiment, the dilute nitric acid has a concentration in a range of 50-70 weight %.

Optionally, the dilute nitric acid has a concentration of 60 weight %.

Optionally, the nitric acid is at a concentration in a range of 96-98 weight %.

In one embodiment, the glycol composition includes PEG in a range of PEG150-PEG800.

In one embodiment, the alkaline composition includes Ammonium Hydroxide which is added in sufficient quantity to the reaction composition so as to neutralize the reaction composition.

Optionally, the reaction composition, when neutralized has a pH in a range of 4 to 12.

In one embodiment, the separation arrangement is operable to separate the PEGDN and Ammonium Nitrate using a hydrophobic solvent.

Optionally, the hydrophobic solvent is one of methylene chloride, a hexane, a pentane or a silicone.

In one embodiment, the feed for the cooling arrangement uses a coolant applied to a region which is spatially adjacent to the series of reaction cells.

Optionally, the series of reaction cells are cooled in operation using a coolant at a temperature in a range of 0° C. to 15° C.

The apparatus of the present disclosure is of advantage in having a smaller inventory giving better temperature control, good heat transfer enabling quicker mixing of reactants, potential to operate at higher temperature to further increase rate, on-line neutralisation, short residence time improving selectivity and yield, lower capital and ease of automation.

It will be appreciated that features of the disclosure are susceptible to being combined in various combinations without departing from the scope of the disclosure as defined by the appended claims.

DESCRIPTION OF THE DIAGRAMS

Embodiments of the present disclosure will now be described, by way of example only, with reference to the following diagrams wherein.

In the accompanying diagrams, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DESCRIPTION OF EMBODIMENTS OF THE DISCLOSURE

The present disclosure generally relates to an apparatus and a method for continuous production of polyethylene glycol dinitrate (PEGDN). Specifically, the apparatus of present disclosure provides improved manufacturing of PEGDN. The PEGDN may be used in conjunction with combustible hydrocarbon fuels. Generally, such apparatus and method employ a process which is based on the below mentioned reactions:

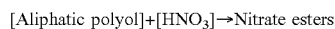  Eq. 1

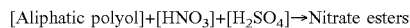  Eq. 2

However, the present disclosure is primarily concerned with an improved apparatus and method of producing PEGDN. The improved method employs a process which is based on the below mentioned reactions:

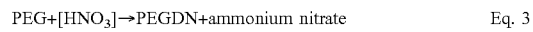  Eq. 3

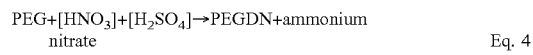  Eq. 4

Figure 1:
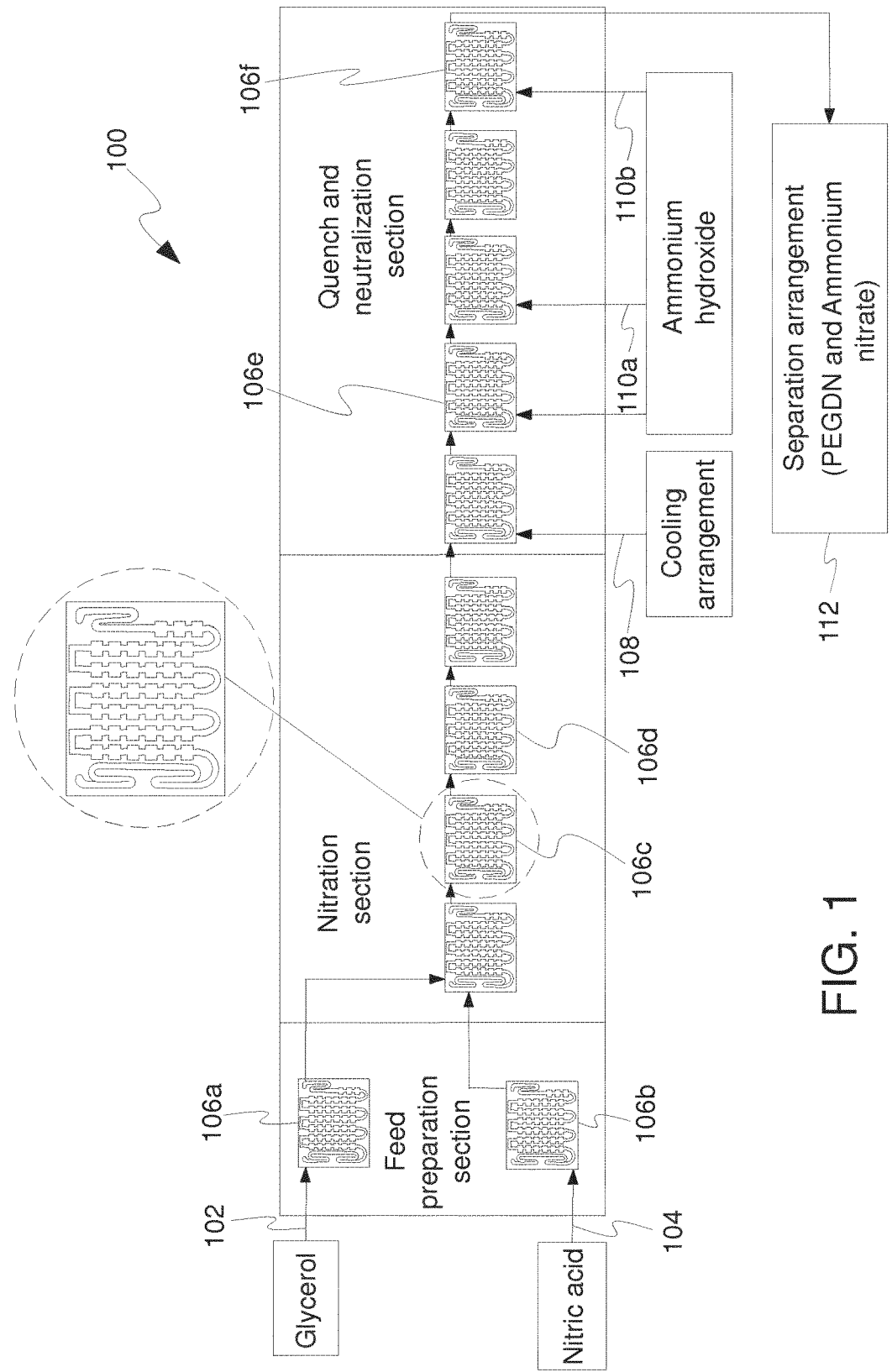
FIG. 1 is an illustration of an apparatus for producing PEGDN and ammonium nitrate, according to an embodiment of the present disclosure.

Referring now to FIG. 1, shown is an apparatus 100 for producing Dinitrate (PEGDN), according to an embodiment of the present disclosure. The apparatus 100 uses nitric acid and PEG for the production of PEGDN. Specifically, the apparatus 100 is configured to mix and react the chosen reagents, to subsequently generate an aqueous stream treated with an alkali, and, finally separate reaction products (PEGDN or another nitrate ester) from the aqueous stream.

As shown, the apparatus 100 includes a feedstream 102 for introducing a substrate aliphatic polyol, specifically PEG. The apparatus 100 also includes another feedstream 104 for introducing nitric acid. The apparatus 100 further includes a plurality of reaction cells such as reaction cells 106a, 106b, 106c, 106d, 106e and 106f having planer structure. The feedstreams 102, 104 along with the reaction cells 106a, 106b constitute a feed preparation section of the apparatus 100. Further, as shown, the reaction cells 106c, 106d constitute a nitration section, and the reaction cells 106e, 106f constitute a quench and neutralization section of the apparatus 100. The quench and neutralization section of the apparatus 100 includes a feed 108 for a cooling arrangement, and a plurality of feeds 110a, 110b and 110c for Ammonium hydroxide or ammonia to quench and neutralise a reaction composition (i.e. PEG together with nitric acid). The apparatus 100 also includes a separation arrangement 112 in which a biphasic product containing PEGDN and aqueous ammonium nitrate is separated.

Figure 2:
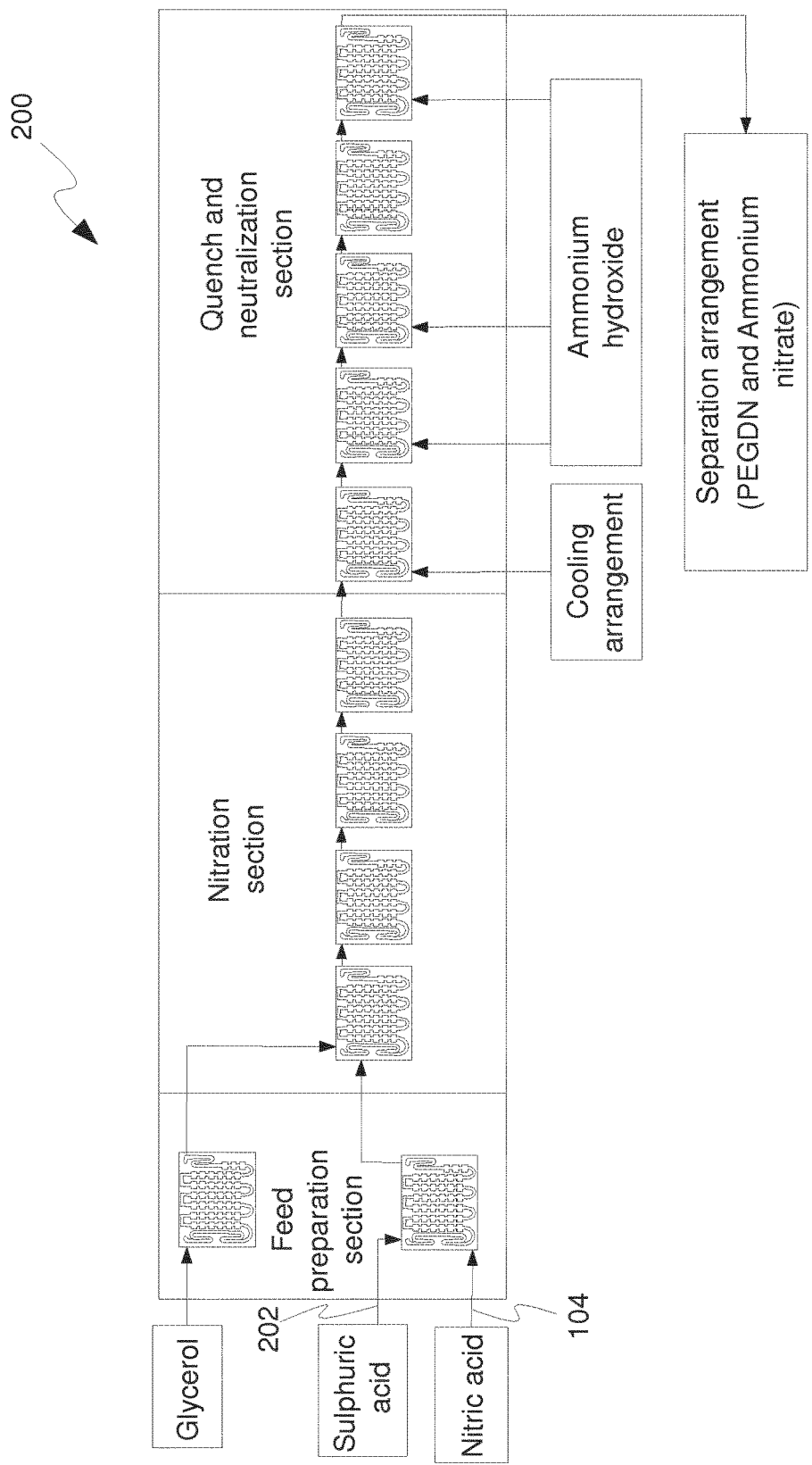
FIG. 2 is an illustration of an apparatus for producing PEGDN and ammonium nitrate, according to another embodiment of the present disclosure.

Referring now to FIG. 2, shown is an apparatus 200 for producing PEGDN, according to another embodiment of the present disclosure. The apparatus 200 of FIG. 2 is substantially structurally and functionally similar to the apparatus 100 of FIG. 1, however, the apparatus 200 includes a provision for another feedstream 202. Specifically, a feed preparation section of the apparatus 200 includes the feedstream 202 for introducing sulphuric acid over and above the feedstream 104 (of the apparatus 100).

The apparatus of FIGS. 1 and 2 are susceptible to being used for manufacturing other types of fuel additives, if required, for example other types of nitrate esters.

Figure 3:
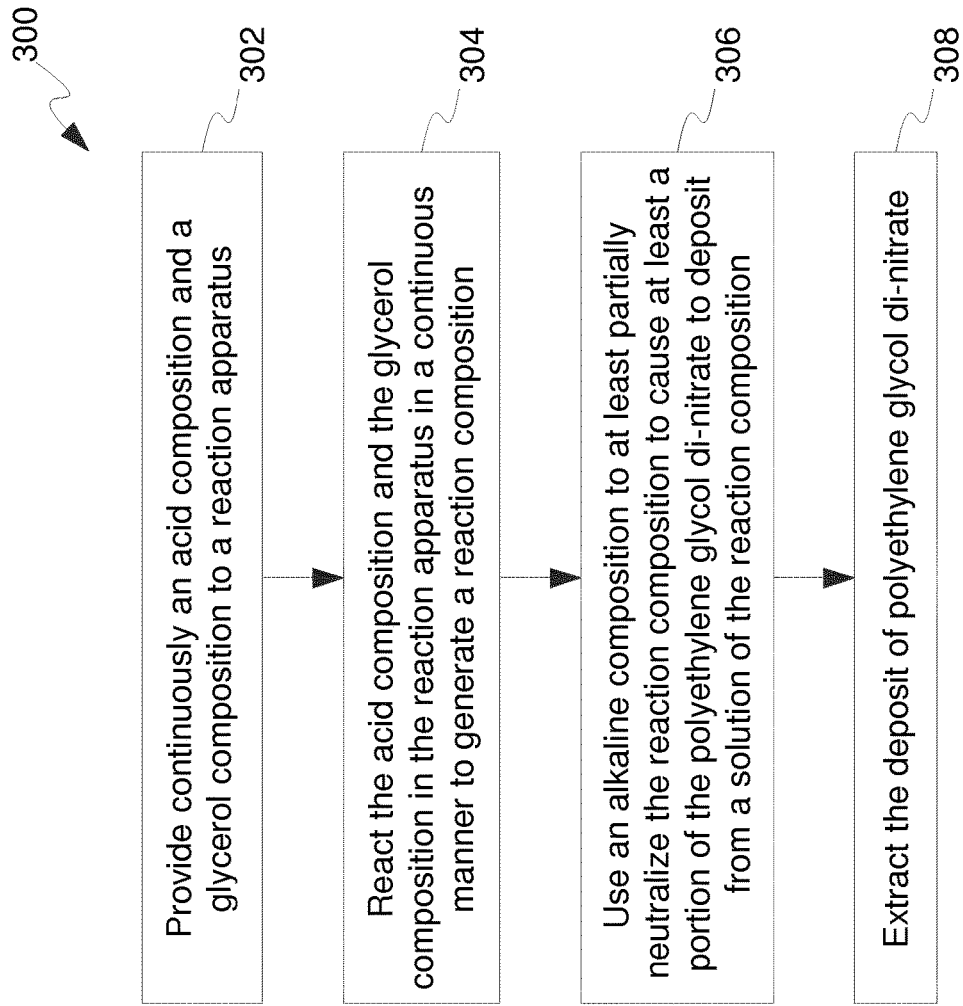
FIG. 3 is an illustration of steps of a method for producing PEGDN and ammonium nitrate, according to an embodiment of the present disclosure.

Referring now to FIG. 3, illustration of steps of a method 300 of continuously producing PEGDN is shown, in accordance with an embodiment of the present disclosure. Specifically, the method 300 relates to the apparatuses of FIGS. 1 and 2 for the production of PEGDN.

Step 302, continuously provides an acid composition and a glycol composition to a reaction apparatus.

Step 304, the acid composition and the glycol composition react in the reaction apparatus in a continuous manner to generate a reaction composition.

Step 306, an alkaline composition is used to at least partially neutralize the reaction composition and to cause at least a portion of the polyethylene glycol dinitrate to deposit from a solution of the reaction composition.

Step 308, the deposit of polyethylene glycol dinitrate is extracted.

The steps 302 to 308 are only illustrative and other alternatives can also be provided where one or more steps are added, one or more steps are removed, or one or more steps are provided in a different sequence without departing from the scope of the claims herein. For example, the method 300 also includes separating the PEGDN and Ammonium Nitrate using a hydrophobic solvent. The method 300 is further explained in detail in conjunction with few examples.

Example 1 Synthesis and Purification of PEGDN

Example 1.1 Synthesis of PEGDN using Continuous Flow and Concentrated Nitric Acid Example 1.1 mainly corresponds to FIG. 1, in which the preparation of the nitrate ester PEGDN is performed in an advanced flow reactor (such as the apparatus 100). The 100 ml of strong nitric acid (80-99 weight % or 96-98 weight %) and 100 ml of glycol are mixed. The reaction mixture is cooled with refrigerated heat transfer fluid like ethylene glycol, applied spatially adjacent to the series of reaction cells to maintain the specified reaction temperature (0-15° C.). The series of reaction cells, spatially disposed in one or more planar structures in which the acid composition and the glycol composition mix in a turbulent manner determine the purity of the product. The reaction cells are cooled in operation to avoid spatial reaction hotspots and thereby prevent thermal runaway occurring within the reaction apparatus. The neutralization of the acidic reactant composition includes introduction of sufficient Ammonium Hydroxide to effect neutralisation of the reaction mixture. The neutralised mixture has a pH in the range of 4-12. The two phase liquid product is then fed into a continuous separation arrangement for receiving the reaction composition and separating therefrom in a continuous manner polyethylene glycol dinitrate (PEGDN) and ammonium nitrate solution. In the separating arrangement the hydrophobic solvent used for extracting the PEGDN is one of methylene chloride and similar polyhalogenated hydrocarbons, a pentane or a hexane. The reagents were bought from Fisher Scientific, and had at least 99% degree of purity.

Example 1.2 Synthesis of PEGDN using Continuous Flow and Nitric Acid and Concentrated Sulphuric acid Example 1.2 corresponds to FIG. 2, i.e. the preparation of the PEGDN uses 50 ml of strong sulphuric acid (i.e., 80-99 weight % or 96-98 weight %) and dilute nitric acid (i.e. 50-70 weight % or 60 weight %) instead of only using the strong nitric acid. Also, the preparation of the PEGDN includes use of 50 ml of pure PEG. It may be evident to those skilled in the art that the preparation Example 1.2 follows the same subsequent steps as explained in Example 1.1.

Example 2 Retrieval of Ammonium Nitrate

Example 2 corresponds to both FIGS. 1 and 2, i.e. the PEGDN separates out of solution during the addition of the ammonium hydroxide as the pH is approaching neutrality. The two phase liquid product is then fed into a continuous separation arrangement and the PEGDN thus is recovered using a hydrophobic solvent which is one of methylene chloride and similar polyhalogenated hydrocarbons, a hexane, a pentane or a silicone. After phase separation two products are obtained. The first is the required product, PEGDN. The second is a solution of ammonium nitrate, which is a well known fertiliser.

Further, the aforementioned PEGDN and similar additives can be added to fuels, for example alcohols, heavy fuel oil, LNG, PNG and similar. Such alcohols include, for example: ethanol, methanol.

Modifications to embodiments of the disclosure described in the foregoing are possible without departing from the scope of the disclosure as defined by the accompanying claims. Expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural. Numerals included within parentheses in the accompanying claims are intended to assist understanding of the claims and should not be construed in any way to limit subject matter claimed by these claims.

The invention claimed is:

1. A reaction apparatus for producing polyethylene glycol dinitrate (PEGDN) in a continuous manner, the reaction apparatus comprising:
a series of reaction cells spatially disposed in one or more planar structures, wherein the plurality of reaction cells includes;
a feed preparation section having feedstreams for continuously providing an acid composition and a glycol composition to reaction cells thereof, wherein the acid composition includes a mixture of dilute nitric acid and concentrated sulphuric acid;
a nitration section in which the acid composition and the glycol composition react in reaction cells in a continuous manner to generate a reaction composition; and
a quench and neutralization section having a feed for a cooling arrangement for cooling reaction cells to avoid spatial reaction hotspots and thereby preventing thermal runaway occurring within the reaction apparatus, and a plurality of feeds for providing an alkaline composition to at least partially neutralize the reaction composition to cause at least a portion of the polyethylene glycol dinitrate to deposit from a solution of the reaction composition; and
a separation arrangement for extracting the deposit of polyethylene glycol dinitrate.

2. The reaction apparatus of claim 1, wherein the acid composition includes the dilute nitric acid in a concentration range of 50-70 weight %.

3. The reaction apparatus of claim 2, wherein the concentration of dilute nitric acid is 60 weight %.

4. The reaction apparatus of claim 1, wherein the acid composition includes the concentrated sulphuric acid in a concentration range of 96-98 weight %.

5. The reaction apparatus of claim 1, wherein the glycol composition includes PEG with a molecular weight in a range of from 150-800.

6. The reaction apparatus of claim 1, wherein the reaction composition has a pH in a range of 4 to 12.

7. The reaction apparatus of claim 1, wherein the separation arrangement separates the PEGDN and Ammonium Nitrate using a hydrophobic solvent.

8. The reaction apparatus of claim 7, wherein the hydrophobic solvent is one of methylene chloride, a hexane, a pentane or a silicone.

9. The reaction apparatus of claim 1, wherein the feed for the cooling arrangement uses a coolant applied to a region which is spatially adjacent to the series of reaction cells.

10. The reaction apparatus of claim 7, wherein the series of reaction cells are cooled in operation using a coolant at a temperature in a range of 0° C. to 15° C.

11. The reaction apparatus of claim 1, wherein the acid composition includes the dilute nitric acid and the concentrated sulphuric acid in equal volumes.

* * * * *